US012765698B2

(12) United States Patent
Shibata

(10) Patent No.: US 12,765,698 B2
(45) Date of Patent: Oct. 20, 2026

(54) RESTRAINING DEVICE FOR CHILDCARE EQUIPMENT WITH SEAT

(71) Applicant: Graco Children's Products Inc., Atlanta, GA (US)

(72) Inventor: Yuji Shibata, Tokyo (JP)

(73) Assignee: Graco Children's Products Inc., Atlanta, GA (US)

(*) Notice: Subject to any disclaimer, the term of this patent is extended or adjusted under 35 U.S.C. 154(b) by 91 days.

(21) Appl. No.: 18/952,651

(22) Filed: Nov. 19, 2024

(65) Prior Publication Data

US 2025/0169621 A1 May 29, 2025

(30) Foreign Application Priority Data

Nov. 24, 2023 (JP) ................................ 2023-198918

(51) Int. Cl.

*B60N 2/28* (2006.01)
*A47D 15/00* (2006.01)
*B60N 2/26* (2006.01)
*B62B 9/24* (2006.01)

(52) U.S. Cl.

CPC ........... *A47D 15/006* (2013.01); *B60N 2/265* (2013.01); *B60N 2/2812* (2013.01); *B60N 2/2839* (2013.01); *B60N 2/28* (2013.01); *B62B 9/24* (2013.01)

(58) Field of Classification Search

CPC ...... B60N 2/28; B60N 2/2812; B60N 2/2839; A47D 15/006; B62B 9/24
USPC ........................................................ 297/467
See application file for complete search history.

(56) References Cited

U.S. PATENT DOCUMENTS 5,549,356 A * 8/1996 Gray .................... B60N 2/2839 297/484
7,445,286 B2 11/2008 Siewertsen et al.
8,944,503 B2 * 2/2015 Gates .................. B60N 2/2812 297/475
11,064,815 B2 * 7/2021 Webb .................. A47D 15/006
2002/0109391 A1 * 8/2002 Shie ...................... B60R 22/105 297/467
2010/0078908 A1 * 4/2010 Pos ........................... B62B 9/24 280/47.38

FOREIGN PATENT DOCUMENTS

CN 112297969 A * 2/2021 ........... B60N 2/2818
JP H07-002007 A 1/1995

* cited by examiner

*Primary Examiner* — Rodney B White
(74) *Attorney, Agent, or Firm* — Eversheds Sutherland (US) LLP

(57) ABSTRACT

A restraining device for childcare equipment with a seat includes: a seat body including a seat portion and a backrest portion; and a restraint belt attitude maintaining mechanism. The restraint belt attitude maintaining mechanism is supported so as to be rotatable with respect to the seat body, and has a change point at an intermediate position of its rotation range. When located on one side with respect to the change point, the restraint belt attitude maintaining mechanism applies such a biasing force that attains a restraining position for restraining a body of a child. When located on the other side with respect to the change point, the restraint belt attitude maintaining mechanism applies such a biasing force that attains a non-restraining position for not restraining the body of the child.

9 Claims, 8 Drawing Sheets

RESTRAINING DEVICE FOR CHILDCARE EQUIPMENT WITH SEAT

CROSS-REFERENCE TO RELATED APPLICATIONS

This application claims priority to JP Patent Application No. 2023-198918, filed Nov. 24, 2023, the entire contents of which are incorporated herein by reference.

BACKGROUND

The present invention relates to restraining devices for childcare equipment with a seat, and more particularly to a restraining device for childcare equipment with a seat for restraining the body of a child seated in a seat body.

For example, childcare equipment with a seat, such as a stroller or a car seat, is provided with shoulder belts, a waist belt, and a crotch belt to restrain the body of a child seated in a seat body. The child's body can be fixed to the seat body by seating the child in the seat body and connecting these belts with buckles.

U.S. Pat. No. 7,445,286 discloses a configuration in which shoulder belts are biased in a releasing direction and the shoulder belts are flipped up when a buckle is disengaged. Japanese Unexamined Patent Publication No. H07-2007 discloses that a cushioning material is attached to the back of a crotch belt and the back of a buckle so that the crotch belt stands on its own from the seat surface and the position and attitude of the buckle are maintained by the cushioning material.

SUMMARY

When placing a child in a seat body of childcare equipment with a seat, it is necessary to first place the child on shoulder belts and then pull the shoulder belts outward from under the child and connect them, or it is necessary to move the shoulder belts to the sides of the seat and then place the child in the seat body and connect the shoulder belts, which is troublesome.

According to the technique disclosed in U.S. Pat. No. 7,445,286, when placing a child in a car seat, the shoulder belts are kept flipped up and therefore do not get in the way. However, since the shoulder belts are always biased in the releasing direction, a restraining force when the shoulder belts are engaged with the buckle is weak. According to the technique disclosed in Japanese Unexamined Patent Publication No. H07-2007, the crotch belt merely stands on its own, which is not enough to allow to easily place and remove a child in and from the seat.

The present invention was made to solve the above problems, and it is an object of the present invention to provide a restraining device for childcare equipment with a seat that allows to easily place and remove a child in and from a seat.

In order to achieve this object, a restraining device for childcare equipment with a seat according to an aspect of the present invention includes: a seat body including a seat portion and a backrest portion; and a restraint belt attitude maintaining mechanism that is supported so as to be rotatable with respect to the seat body, that has a change point at an intermediate position of a rotation range of the restraint belt attitude maintaining mechanism, and that, when located on one side with respect to the change point, applies such a biasing force that attains a restraining position for restraining a body of a child, and when located on the other side with respect to the change point, applies such a biasing force that attains a non-restraining position for not restraining the body of the child.

Preferably, the restraint belt attitude maintaining mechanism includes a restraint belt that restrains the body of the child seated in the seat body.

Preferably, the restraint belt is a crotch belt that restrains a crotch of the child seated in the seat body.

Preferably, the restraint belt attitude maintaining mechanism includes: a belt support member that extends along the restraint belt and that is supported so as to be rotatable with respect to the seat body; and a biasing mechanism that has the change point at the intermediate position in the rotation range, and that attains the restraining position when located on the one side with respect to the change point, and attains the non-restraining position when located on the other side with respect to the change point.

Preferably, the restraint belt attitude maintaining mechanism further includes a fixed base fixed to the seat body, and the belt support member is supported so as to be rotatable with respect to the fixed base.

Preferably, the belt support member includes a plate that supports the restraint belt and a sleeve that surrounds both the plate and the restraint belt.

Preferably, the biasing mechanism is an elastic member having one end connected to the plate and the other end connected to the fixed base.

Preferably, the change point is a position where the elastic member and the plate are in a linear relationship in which the elastic member and the plate are located linearly, and the restraint belt attitude maintaining mechanism is in the restraining position when the elastic member and the plate are out of the linear relationship and located on the one side, and is in the non-restrained position when the elastic member and the plate are out of the linear relationship and located on the other side.

Preferably, the change point is when the restraint belt attitude maintaining mechanism is in a linear form, the restraint belt attitude maintaining mechanism is in the restraining position when in a form curved toward the one side, and the restraint belt attitude maintaining mechanism is in the non-restraining position when in a form curved toward the other side.

According to the present invention, it is possible to easily place and remove a child in and from a seat.

BRIEF DESCRIPTION OF THE DRAWINGS

FIG. 3A shows the state in a restraining position, and FIG. 3B shows the state in a non-restraining position.

FIG. 4A is a longitudinal section and FIG. 4B is a transverse section taken along line IVb-IVb in FIG. 4A.

FIG. 5A shows the state in the restraining position, FIG. 5B shows the state at a change point, and FIG. 5C shows the state in the non-restraining position.

FIG. 7A is a perspective view and FIG. 7B is a side view.

FIG. 8A is a perspective view and FIG. 8B is a side view.

DETAILED DESCRIPTION

Figure 1:
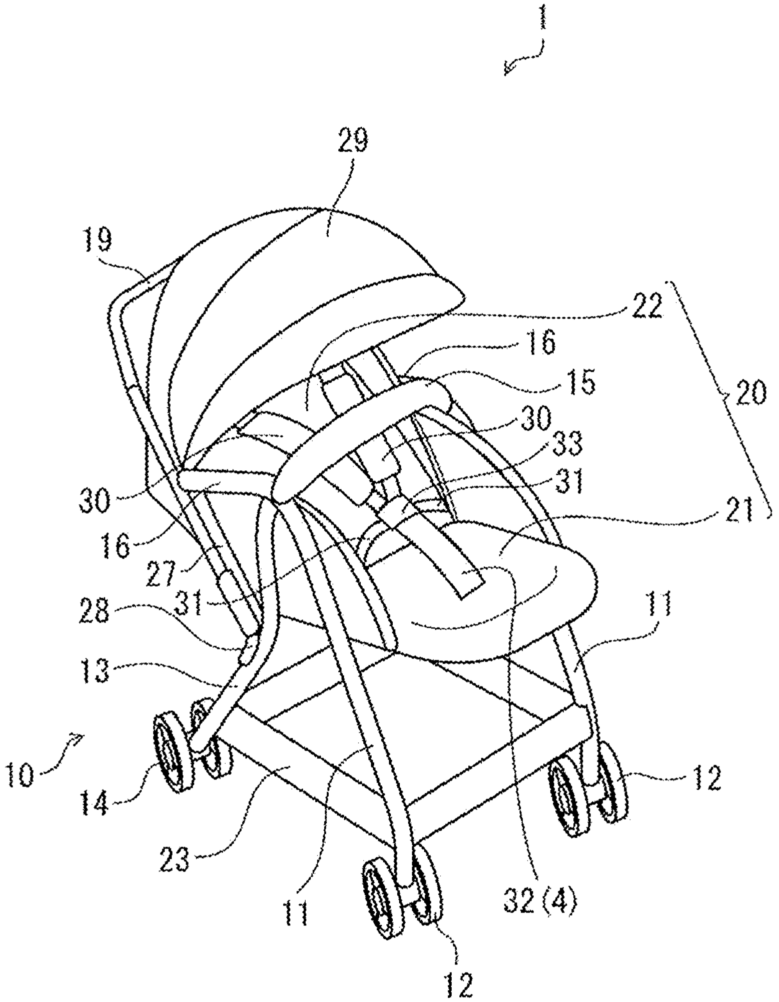
FIG. 1 is a perspective view of a stroller using a restraining device for childcare equipment with a seat according to a first embodiment of the present invention.

Embodiments of the present invention will be described in detail with reference to the drawings. The same or corresponding portions are denoted by the same reference characters throughout the drawings, and description thereof will not be repeated.

First, an example of childcare equipment with a seat that is provided with a restraining device for restraining a child's body will be described. The childcare equipment with a seat using the restraining device may be any childcare equipment that has a seat for a child to sit in, such as a stroller, a car seat, or a bouncer. An example in which the restraining device is applied to a stroller 1 will be described in the embodiments.

Overview of Stroller

Figure 2:
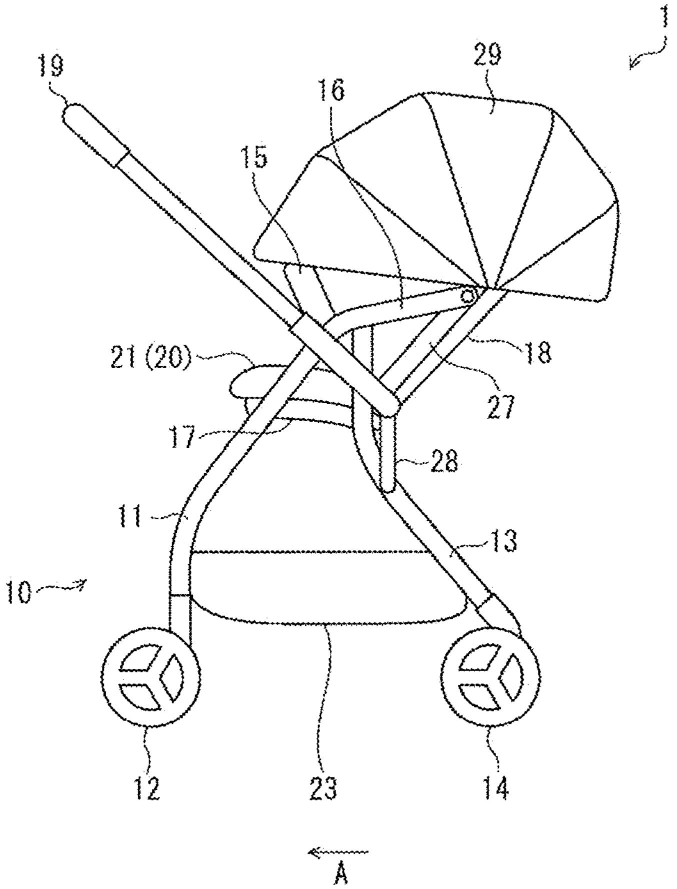
FIG. 2 is a side view of the stroller using the restraining device for childcare equipment with a seat according to the first embodiment of the present invention.

An overview of the stroller 1 according to the embodiment will be described with reference to FIG. 1. FIG. 1 is a perspective view of the stroller 1, and FIG. 2 is a side view of the stroller 1. In the following description, the front-rear direction corresponds to the front-rear direction of the stroller 1, and the left-right direction corresponds to the left-right direction as viewed from the front of the stroller 1. For better understanding, the direction shown by the arrow A in FIG. 2 is herein defined as the forward direction, and the opposite direction to the arrow A is defined as the rearward direction. FIG. 1 shows the stroller 1 in front-facing mode, and FIG. 2 shows the stroller 1 in rear-facing mode.

The basic structure of the stroller 1 may be the same as that of a common stroller. The stroller 1 includes a vehicle body frame 10 and a seat body 20. The vehicle body frame 10 includes a pair of front legs 11, a pair of rear legs 13, a front guard 15, a pair of armrests 16, a seat support member 17, a backrest support member 18, and a handlebar 19. The components of the vehicle body frame 10 other than the front guard 15, the seat support member 17, the backrest support member 18, and the handlebar 19 are provided in pairs on both right and left sides and spaced apart from each other in the width direction (vehicle width direction).

Front wheels 12 are installed at the lower ends of the front legs 11 that extend in the vertical direction. Rear wheels 14 are installed at the lower ends of the rear legs 13 that extend in the vertical direction behind the front legs 11. A basket body 23 that can hold things like bags is provided at the lower ends of the front and rear legs 11, 13. The basket body 23 is in the shape of an open top box, and has its corners fixed to intermediate positions in the vertical direction of the front and rear legs 11, 13.

The front guard 15 extends in the width direction at a front position of the seat body 20 and is connected to the fronts of the armrests 16 disposed on both right and left sides of the seat body 20. The front guard 15 may be detachable from the armrests 16. The front ends of the armrests 16 are connected to the upper ends of the front legs 11, and the rear ends of the armrests 16 are connected to the upper ends of a pair of handrail support members 27. The lower ends of the handrail support members 27 contact the rear legs 13, and the handrail support members 27 and the rear legs 13 are locked together.

The handlebar 19 is generally in a U-shape, and is rotatably attached at its lower ends to inverted brackets 28 connected to the rear legs 13. The handlebar 19 is installed so that it can swing in the front-back direction. The handlebar 19 is switchable between a front-facing position (FIG. 1) and a rear-facing position (FIG. 2).

As shown in FIG. 2, a hammock is hung over the seat support member 17 and the backrest support member 18, and a cushion is attached to the hammock. The seat body 20 that is a space for receiving a child is thus formed on the seat support member 17 and the backrest support member 18. In other words, the seat support member 17 and the backrest support member 18 support the seat body 20 from below. As shown in FIG. 1, the seat body 20 includes, for example, a seat portion 21 that supports the child's buttocks, and a backrest portion 22 that supports the child's back.

As shown in FIG. 1, a pair of shoulder belts 30 that restrains the child's shoulders, a pair of waist belts 31 that extends across the seat body 20 in the left-right direction and restrains child's waist, and a crotch belt 32 that extends between the thighs of a child seated in the seat body 20 are provided on the seat body 20. The other ends of these restraint belts 30, 31, and 32 are detachably connected to each other near the child's abdomen by a buckle 33 provided at the distal end of the crotch belt 32. In the present embodiment, a restraint belt attitude maintaining mechanism 4 (FIG. 1) that supports the attitude of the crotch belt 32 is provided along the crotch belt 32. The restraint belt attitude maintaining mechanism 4 will be described later.

A canopy 29 that covers the space above the seat body 20 is provided in the space above the seat body 20. The canopy 29 can be opened and closed.

The stroller 1 according to the present embodiment is a collapsible stroller that can be switched between a deployed state (front-facing position) and a collapsed state, not shown. In order to switch the stroller 1 from the deployed state to the collapsed state, the handrail support members 27 and the rear legs 13 are unlocked from each other, the inverted brackets 28 are turned upside down, and the lower ends of the handlebar 19 that have been in contact with the upper portions of the rear legs 13 are brought into contact with the lower portions of the rear legs 13. Although not shown in the figures, when the stroller 1 is in the collapsed state, the distance between the pair of front legs 11 and the pair of rear legs 13 in the front-and-rear direction is small, and the seat portion 21 and the backrest portion 22 form a V-shape. This procedure is reversed to switch the stroller 1 from the collapsed state to the deployed state.

First Embodiment

Figure 3A:
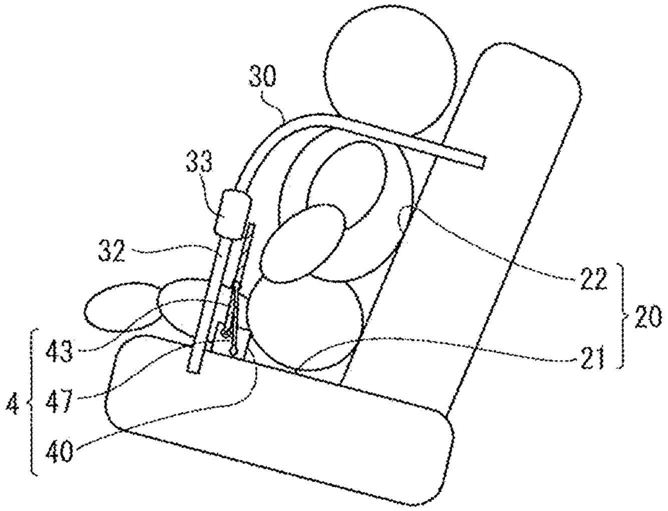
FIGS. 3A and 3B are schematic diagrams showing a change in position of the restraining device according to the first embodiment, where
Figure 3B:
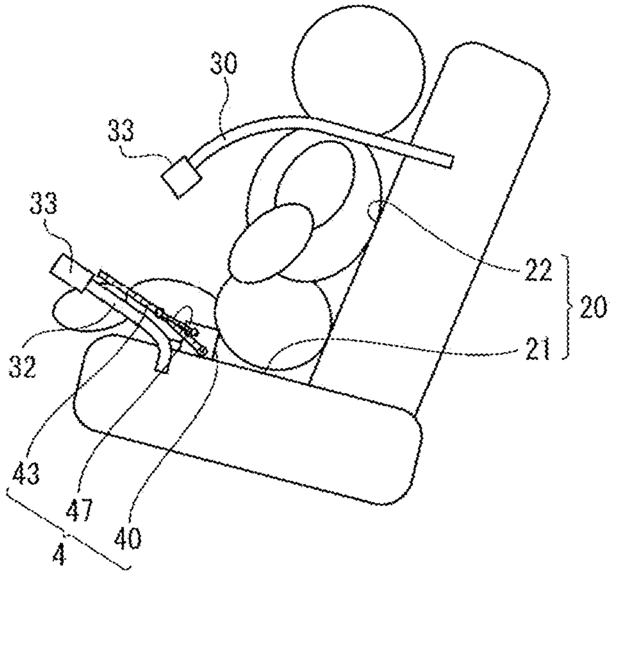
Figure 4A:
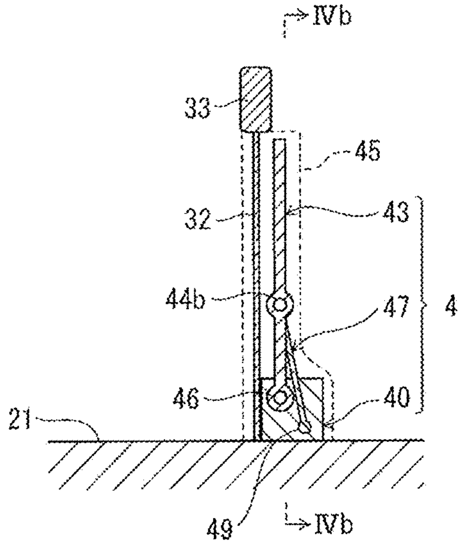
FIGS. 4A and 4B show the restraining device according to the first embodiment, where
Figure 4B:
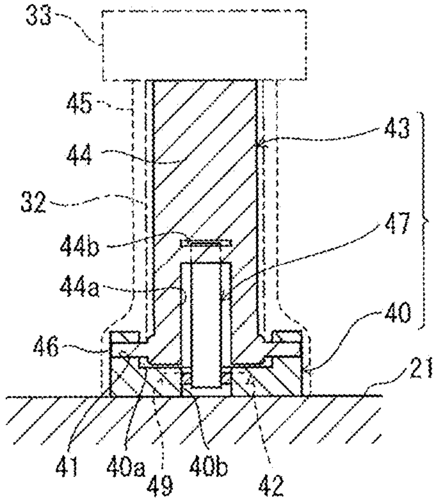
Figure 5A:
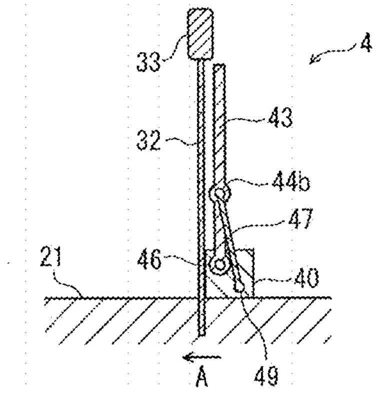
FIGS. 5A to 5C are side views showing a change in position of the restraining device according to the first embodiment, where
Figure 5B:
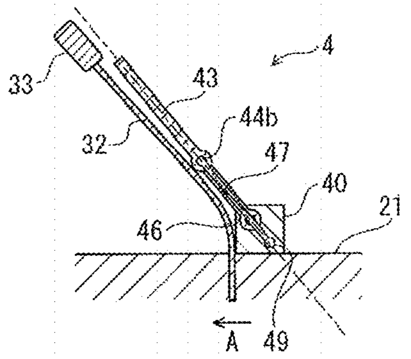
Figure 5C:
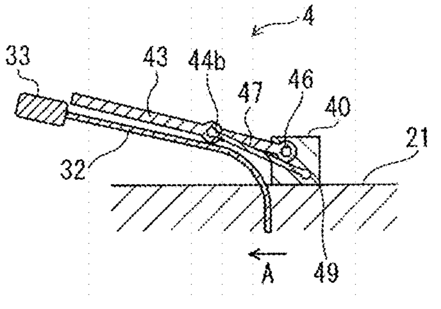

Next, the restraint belt attitude maintaining mechanism 4 that supports the attitude of the crotch belt 32 will be described with reference to FIGS. 3A to 5C. FIGS. 3A and 3B are schematic diagrams showing a change in position of the restraint belt attitude maintaining mechanism 4. FIG. 3A shows the state in a restraining position, and FIG. 3B shows the state in a non-restraining position. FIG. 4A is a longitudinal section of the restraint belt attitude maintaining mechanism 4, and FIG. 4B is a transverse section taken along line IVb-IVb in FIG. 4A. FIGS. 5A to 5C are side views showing a change in position of the restraint belt attitude maintaining mechanism 4. FIG. 5A shows the state in the restraining position, FIG. 5B shows the state at a change point, and FIG. 5C shows the state in the non-restraining position.

The restraint belt attitude maintaining mechanism 4 of the present embodiment brings the crotch belt 32 to the restraining position as shown in FIG. 3A, and brings the crotch belt 32 to the non-restraining position as shown in FIG. 3B. The restraining position is a position where the crotch belt 32 restrains the child's body. When in the restraining position, the crotch belt 32 does not have to be in contact with the child's body and need only be tilted toward the child's body (rearward). The non-restraining position is a position where the crotch belt 32 does not restrain the child's body. The non-restraining position is an open position where the crotch belt 32 is tilted to the opposite side from the child's body (forward) to form an open space on the seat body 20.

The restraint belt attitude maintaining mechanism 4 of the present embodiment is provided along the crotch belt 32. The restraint belt attitude maintaining mechanism 4 is supported so as to be rotatable with respect to the seat body 20, and has a change point at an intermediate position of its rotation range. When located on one side with respect to the change point, the restraint belt attitude maintaining mechanism 4 applies such a biasing force that attains the restraining position where the crotch belt 32 restrains the child's body. When located on the other side with respect to the change point, the restraint belt attitude maintaining mechanism 4 applies such a biasing force that attains the non-restraining position where the crotch belt 32 does not restrain the child's body.

The configuration of the restraint belt attitude maintaining mechanism 4 will be described with reference to FIGS. 4A and 4B. The restraint belt attitude maintaining mechanism 4 generally includes a fixed base 40 fixed to the seat portion 21, a belt support member 43 that supports the crotch belt 32, and a biasing mechanism 47 that biases the belt support member 43. As shown in FIG. 4A, the restraint belt position maintaining mechanism 4 is located behind the crotch belt 32.

The fixed base 40 is a portion provided on the seat portion 21 and protruding from the seat portion 21. The fixed base 40 has two holes 41, 42 at different positions. A pair of first shafts 46 that rotatably supports a plate 44 of the belt support member 43 is located in a pair of first holes 41. A second shaft 49 that supports the lower end of the biasing mechanism 47 is located in a second hole 42. Specifically, as shown in FIGS. 4A and 4B, the first holes 41 are located above and in front of the second hole 42.

As shown in FIG. 4B, the fixed base 40 has a wide first recess 40*a* in the upper end of the middle portion of the fixed base 40, and a second recess 40*b* located below the first recess 40*a* and narrower than the first recess 40*a*. The lower end of the belt support member 43 is disposed in the first recess 40*a*, and the lower end of the biasing mechanism 47 is disposed in the second recess 40*b*.

The belt support member 43 extends along the crotch belt 32 and is supported so as to be rotatable with respect to the fixed base 40. The belt support member 43 includes the plate 44 and a sleeve 45 (shown by a dashed line) that surrounds both the plate 44 and the crotch belt 32. The plate 44 extending along the crotch belt 32 does not necessarily means that the entire plate 44 extends along the crotch belt 32, and may mean that part of the plate 44 is kept at a close distance from the crotch belt 32 and is not separated away from the crotch belt 32.

As shown in FIG. 4B, the plate 44 has an opening 44*a* that extends upward from the lower end of the plate 44 as viewed in plan. A catching portion 44*b* extending across the opening 44*a* from left to right is provided at the upper end of the opening 44*a*. The biasing mechanism 47 is disposed in the vertical direction in which the opening 44*a* extends, and the catching portion 44*b* supports the upper end of the biasing mechanism 47.

The first shafts 46 protruding in the left-right direction are provided at both ends located at the lower end of the opening 44*a*. The first shafts 46 are inserted through the first holes 41 of the fixed base 40. The first shafts 46 function as a rotating shaft of the belt support member 43. The belt support member 43 is thus rotatable in the front-rear direction about the first shafts 46. In the present embodiment, the belt support member 43 can rotate 90° with respect to the fixed base 40. However, the rotation angle is not limited, and may be, for example, 180°. Alternatively, a stopper may be provided to make the rotation angle adjustable.

The sleeve 45 may have any shape as long as the sleeve 45 surrounds the components other than the buckle 33. The sleeve 45 is made of, for example, cushioned cloth, and can also be used as a crotch belt cover. The sleeve 45 can be easily removed and can be washed when it gets dirty. The sleeve 45 covers both the plate 44 and the crotch belt 32, so that movement of the plate 44 can be transmitted to the crotch belt 32. When used as a crotch belt cover, the sleeve 45 is preferably provided along the vertical length of the crotch belt 32, but may cover only part in the vertical direction of the crotch belt 32.

The biasing mechanism 47 has its one end connected to the plate 44 and the other end connected to the fixed base 40. The biasing mechanism 47 is an elastic member such as a rubber band, a tension spring, or a compression spring, and may be a member having elasticity due to its material or shape. Specifically, the upper end of the biasing mechanism 47 is engaged with the catching portion 44*b* of the plate 44, and the lower end of the biasing mechanism 47 is engaged with the second shaft 49. The second shaft 49 is fixed in the second hole 42 of the fixed base 40. The second shaft 49 functions as a rotating shaft of the biasing mechanism 47. The biasing mechanism 47 is thus rotatable in the front-rear direction about the second shaft 49. Since the rotating shaft of the belt support member 43 and the rotating shaft of the biasing mechanism 47 are thus provided at different positions, the change point is provided when the belt support member 43 rotates about the second shaft 49.

Next, the operation of the restraint belt attitude maintaining mechanism 4 will be described with reference to FIGS. 5A to 5C.

As shown in FIG. 5A, when the restraint belt attitude maintaining mechanism 4 is in the restraining position, the biasing mechanism 47 and the plate 44 are out of a linear relationship shown by a long dashed short dashed line in FIG. 5B and are located on the rear side. FIG. 5A shows the belt support member 43 standing perpendicularly to the seat portion 21. However, the belt support member 43 may be tilted rearward, or may be tilted to such a position that the belt support member 43 extends along the child's crotch.

FIG. 5B shows the restraint belt attitude maintaining mechanism 4 being at the change point. The change point is a position where the biasing mechanism 47 and the plate 44 are located linearly, namely a position where the biasing mechanism 47 and the plate 44 are in the linear relationship. Specifically, the change point is the position shown by the long dashed short dashed line. When at the change point, the plate 44 is not held in this position, and this position of the plate 44 is merely a passing point for the plate 44.

As shown in FIG. 5C, when the restraint belt attitude maintaining mechanism 4 is in the non-restraining position, the biasing mechanism 47 and the plate 44 are out of the linear relationship shown by the long dashed short dashed line and are located on the front side. FIG. 5B shows the state in which the belt support member 43 is in a horizontal positional relationship to the seat portion 21, but the belt support member 43 may simply fall (be tilted) forward.

How to operate the restraint belt attitude maintaining mechanism 4 will be described with reference to FIGS. 5A to 5C.

When placing a child in the seat body 20, an operator moves the buckle 33 or the crotch belt 32 (or the sleeve 45, not shown) forward with the buckle 33 disengaged. At this time, the operator moves the belt support member 43 of the restraint belt attitude maintaining mechanism 4 forward beyond the change point shown by the long dashed short dashed line in FIG. 5B. The belt support member 43 is thus displaced from the position where the biasing mechanism 47 is located rearward of the belt support member 43 (restraining position) as shown in FIG. 5A to the position where the biasing mechanism 47 is located forward of the belt support member 43 (non-restraining position) as shown in FIG. 5C via the change point shown in FIG. 5B.

Next, the child is placed in the seat body 20, the operator moves the belt support member 43 from front to rear. At this time, the operator moves the belt support member 43 of the restraint belt attitude maintaining mechanism 4 rearward beyond the change point shown by the long dashed short dashed line in FIG. 5B. The belt support member 43 is thus displaced from the position where the biasing mechanism 47 is located forward of the belt support member 43 (non-restraining position) as shown in FIG. 5C to the position where the biasing mechanism 47 is located rearward of the belt support member 43 (restraining position) as shown in FIG. 5A via the change point shown in FIG. 5B. Lastly, the buckle 33 is engaged.

When removing the child from the seat body 20, the operator first disengages the buckle 33. The operator then moves the buckle 33 or the crotch belt 32 rearward. At this time, the operator moves the belt support member 43 of the restraint belt attitude maintaining mechanism 4 forward beyond the change point shown by the long dashed short dashed line in FIG. 5B. The belt support member 43 is thus displaced from the position where the biasing mechanism 47 is located rearward of the belt support member 43 (restraining position) as shown in FIG. 5A to the position where the biasing mechanism 47 is located forward of the belt support member 43 (non-restraining position) as shown in FIG. 5C via the change point shown in FIG. 5B.

As described above, the restraint belt attitude maintaining mechanism 4 according to the present embodiment can attain the restraining position for restraining the child's body, when located forward of the change point, and can attain the non-restraining position for not restraining the child's body, when located rearward of the change point. Therefore, the crotch belt 32 can be moved all the way to the rear to contact the child's crotch by merely pushing the crotch belt 32 rearward. The crotch belt 32 can also be moved all the way to the front to be separated from the child's crotch by merely pushing the crotch belt 32 forward. The operator can thus displace the crotch belt 32 to either the restraining position or the non-restraining position with a single touch without moving the crotch belt 32 to the final point of the restraining position or non-restraining position. This allows the operator to easily place and remove the child in and from the seat.

The restraint belt attitude maintaining mechanism 4 is biased to the restraining state when in the restraining position, is biased to the non-restraining state when in the non-restraining position, and is not biased in a releasing direction when in the restraining position. Therefore, the child's body can be reliably held by the restraining belts, which is safe.

Second Embodiment

Figure 6:
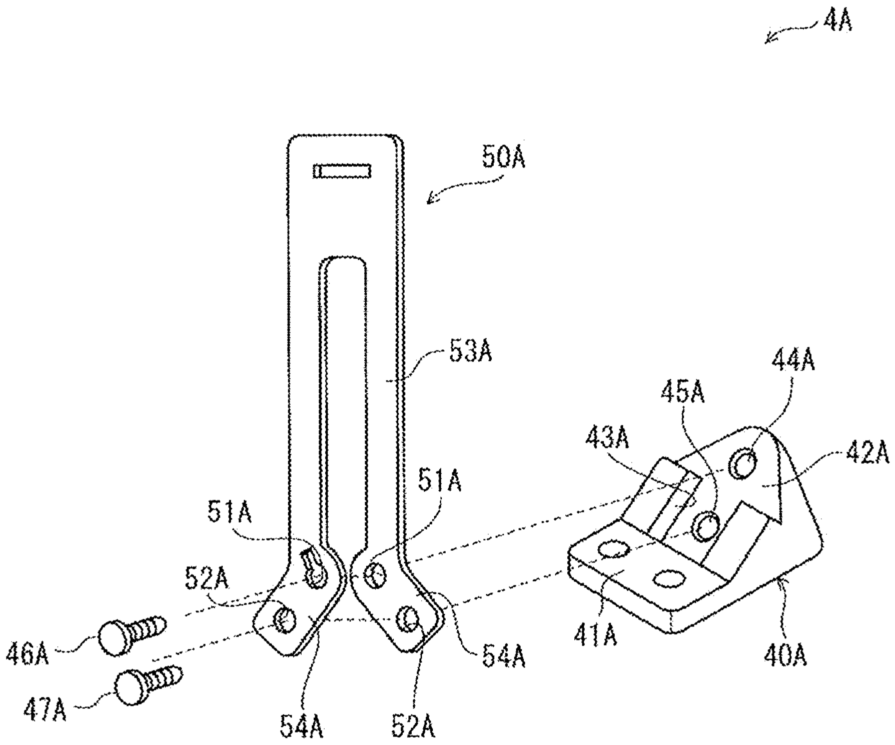
FIG. 6 is an exploded perspective view of a restraining device for childcare equipment with a seat according to a second embodiment of the present invention.
Figure 7A:
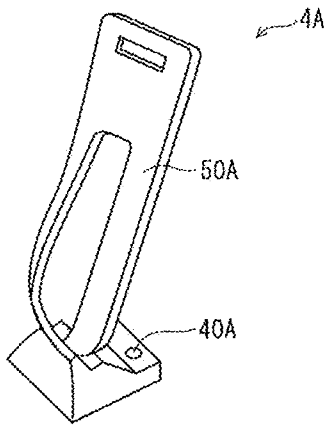
FIGS. 7A and 7B show the restraining device of the second embodiment in a restraining position, where
Figure 7B:
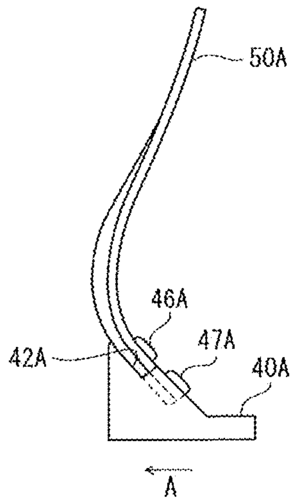
Figure 8A:
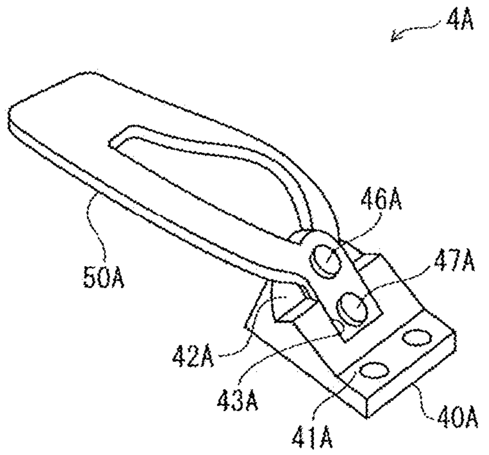
FIGS. 8A and 8B show the restraining device of the second embodiment in a non-restraining position, where
Figure 8B:
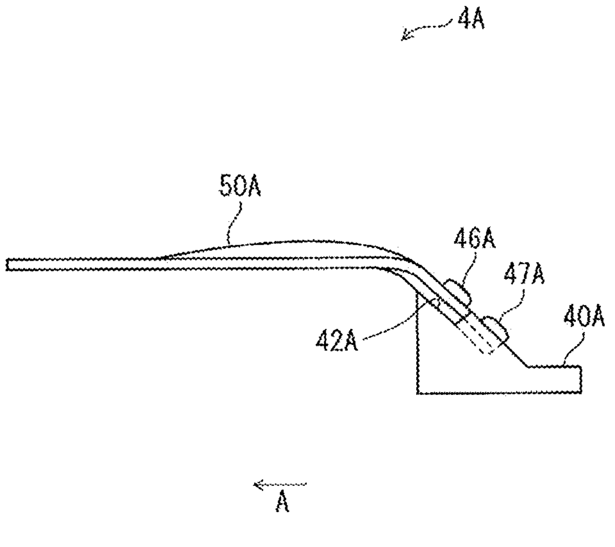

Next, a restraint belt attitude maintaining mechanism 4A according to a second embodiment will be described with reference to FIGS. 6 to 8B. FIG. 6 is an exploded perspective view of a restraining device for childcare equipment with a seat according to the second embodiment. FIGS. 7A and 7B show the restraining device in a restraining position, and FIGS. 8A and 8B show the restraining device in a non-restraining position. Only the differences from the restraint belt attitude maintaining mechanism 4 according to the first embodiment will be described in detail below. The restraint belt attitude maintaining mechanism 4 of the first embodiment is different from the restraint belt attitude maintaining mechanism 4A of the second embodiment in that the biasing mechanism 47 of the first embodiment is an elastic member, whereas a biasing mechanism of the second embodiment is provided by a material and a shape.

Referring to FIG. 6, the restraint belt attitude maintaining mechanism 4A generally includes a fixed base 40A and an attitude maintaining member 50A supported by the fixed base 40A.

The fixed base 40A includes a flat portion 41A located on one side and a protruding portion 42A standing from the other end of the flat portion 41A. The flat portion 41A is a portion fixed to the seat portion 21. The protruding portion 42A together with a step portion 43A fixes the attitude maintaining member 50A. The step portion 43A protrudes upward more as it gets closer to its rear end.

The attitude maintaining member 50A is, for example, a flexible, elastically deformable member. The attitude maintaining member 50A includes a belt support member 53A extending in the vertical direction, and a pair of fixed base support portions 54A provided at the lower end of the belt support member 53A and fixed to the fixed base 40A.

The belt support member 53A is a flexible, elastically deformable member, and includes a biasing mechanism that displaces to a curved shape protruding forward or rearward. The belt support member 53A has its middle portion cut out from the bottom upward. The fixed base support portions 54A are portions tilted outward as it gets away from their top and closer to their bottom. Each of the fixed base support portions 54A has two through holes 51A, 52A in its upper and lower portions. Screws 46A, 47A are inserted through the two through holes 51A and the two through holes 52A and fixed in two holes 44A, 45A of the fixed base 40A, respectively. At this time, the fixed base support portions 54A are placed on top of each other in the front-rear direction and fixed together. Therefore, as shown in FIGS. 7A and 7B, the attitude maintaining member 50A has a curved shape protruding forward.

The operation of the restraint belt attitude maintaining mechanism 4A will now be described with reference to FIGS. 7A to 8B.

As shown in FIGS. 7A and 7B, when the restraint belt attitude maintaining mechanism 4A is in the restraining position, the attitude maintaining member 50A is in a curved form protruding forward in the middle in the vertical direction. On the other hand, as shown in FIGS. 8A and 8B, when the restraint belt attitude maintaining mechanism 4A is in the non-restraining position, the attitude maintaining member 50A is in a curved form protruding upward in the middle in the vertical direction. The restraint belt attitude maintaining mechanism 4A being in the restraining position may be any state as long as the attitude maintaining member 50A is in a curved form protruding rearward in the middle in the vertical direction.

When removing a child from the seat body 20, the operator first disengages the buckle 33. Next, the operator moves either the buckle 33 located at the top of the crotch belt 32 or the crotch belt 32 forward beyond the change point.

How to operate the restraint belt attitude maintaining mechanism 4A will be briefly described with reference to FIGS. 7A to 8B.

When placing a child in the seat body 20, the operator moves the buckle 33 or the crotch belt 32 forward with the buckle 33 disengaged. The attitude maintaining member 50A is thus rotated about the first shafts 46 as a fulcrum, so that the attitude maintaining member 50A becomes a curved form protruding upward in the middle in the vertical direction as shown in FIGS. 8A and 8B. The operator then places the child in the seat body 20 and moves the buckle 33 or the crotch belt 32 from front to rear. The attitude maintaining member 50A is thus rotated about the first shafts 46 as a fulcrum, so that the attitude maintaining member 50A becomes a curved form protruding forward in the middle in the vertical direction as shown in FIGS. 7A and 7B.

When removing the child from the seat body 20, the operator first disengages the buckle 33. Next, the operator moves the buckle 33 or the crotch belt 32 rearward. The attitude maintaining member 50A is thus rotated about the first shafts 46 as a fulcrum, so that the attitude maintaining member 50A becomes the curved form protruding rearward in the middle in the vertical direction as shown in FIGS. 8A and 8B.

MODIFICATIONS

In the first and second embodiments, the restraint belt attitude maintaining mechanism 4, 4A is used to maintain the attitude of the crotch belt 32. However, the restraint belt attitude maintaining mechanism 4, 4A may be used for belts for restraining the child's body, such as the shoulder belts 30 for restraining the child's shoulders and the waist belts 31 for restraining the child's waist.

In the first and second embodiments, the restraint belt attitude maintaining mechanism 4, 4A and the crotch belt 32 are described as separate members. However, the restraint belt attitude maintaining mechanism 4, 4A and the crotch belt 32 may be a single-piece member, or the restraint belt attitude maintaining mechanism alone may restrain the child's body.

In the first and second embodiments, the fixed base 40, 40A is fixed to the seat portion 21. However, the fixed base 40, 40A need not necessarily be provided. The belt support member 43 of the first embodiment and the attitude maintaining mechanism 4A of the second embodiment may be directly fixed to the seat portion 21, or part of the seat body 20 may form the fixed base 40, 40A.

In the first embodiment, the biasing mechanism 47 is used as a structure having a change point. In the second embodiment, a shape and a material are used as a structure having a change point. However, the present invention is not limited to these embodiments, other configurations may be used as a structure having a change point.

The restraint belt attitude maintaining mechanism 4A is described as being located behind the crotch belt 32. However, the restraint belt attitude maintaining mechanism 4A need only be located at a position where it can maintain the attitude of the crotch belt 32. For example, the restraint belt attitude maintaining mechanism 4A may be located in front of the crotch belt 32, or a part of the restraint belt attitude maintaining mechanism 4A may be located in front of the crotch belt 32 and the remaining part thereof may be located behind the crotch belt 32.

Although the embodiments of the present invention are described above with reference to the drawings, the present invention is not limited to the illustrated embodiments. Various modifications and variations can be made to the illustrated embodiments within the same scope as, or within a scope equivalent to, the present invention.

The invention claimed is:

1. A restraining device for childcare equipment with a seat, comprising:

a seat body including a seat portion and a backrest portion; and a restraint belt attitude maintaining mechanism that is supported so as to be rotatable with respect to the seat body between a restraining position for restraining a body of a child and a non-restraining positioning for not restraining the body of the child, the restraint belt attitude maintaining mechanism having a change point at an intermediate position of a rotational range, wherein when located on a first side of the change point, the restraint belt attitude maintaining mechanism applies a first biasing force that attains and maintains the restraining position, and when located on a second side of the change point, the restraint belt attitude maintaining mechanism applies a second biasing force that attains and maintains the non-restraining position for not restraining the body of the child.

2. The restraining device according to claim 1, wherein:

the restraint belt attitude maintaining mechanism includes a restraint belt that restrains the body of the child seated in the seat body.

3. The restraining device according to claim 2, wherein;

the restraint belt is a crotch belt that restrains a crotch of the child seated in the seat body.

4. The restraining device according to claim 1, wherein the restraint belt attitude maintaining mechanism includes;

a belt support member that extends along the restraint belt and that is supported so as to be rotatable with respect to the seat body, and a biasing mechanism that has the change point at the intermediate position of the rotational range, and that attains the restraining position when located on the first side with respect to the change point, and attains the non-restraining position when located on the second side with respect to the change point.

5. The restraining device according to claim 4, wherein;

the restraint belt attitude maintaining mechanism further includes a fixed base fixed to the seat body, and the belt support member is supported so as to be rotatable with respect to the fixed base.

6. The restraining device according to claim 5, wherein:

the belt support member includes a plate that supports the restraint belt and a sleeve that surrounds both the plate and the restraint belt.

7. The restraining device according to claim 6, wherein:

the biasing mechanism is an elastic member having a first end connected to the plate and a second end connected to the fixed base.

8. The restraining device according to claim 7, wherein:
the change point is a position where the elastic member and the plate are in a linear relationship in which the elastic member and the plate are located linearly, and
the restraint belt attitude maintaining mechanism is in the restraining position when the elastic member and the plate are out of the linear relationship and located on the first side, and is in the non-restrained position when the elastic member and the plate are out of the linear relationship and located on the second side.

9. The restraining device according to claim 4, wherein:
the change point is a position where the restraint belt attitude maintaining mechanism is in a linear form, and
the restraint belt attitude maintaining mechanism is in the restraining position when in a form curved toward the first side, and the restraint belt attitude maintaining mechanism is in the non-restraining position when in a form curved toward the second side.

* * * * *